United States Patent [19]
Facey et al.

[11] Patent Number: 6,003,210
[45] Date of Patent: Dec. 21, 1999

[54] METHOD OF USING, AND KIT FOR A SUSPENDING EQUIPMENT

[75] Inventors: Hugh David Facey, Parkhead; Brian Edward Shawcross, Retford, both of United Kingdom

[73] Assignee: Gripple Limited, Sheffield, United Kingdom

[21] Appl. No.: 09/136,390

[22] Filed: Aug. 19, 1998

[30]     Foreign Application Priority Data

Dec. 23, 1997 [GB]   United Kingdom .................... 9727033
Feb. 4, 1998 [GB]    United Kingdom .................... 9802279

[51] Int. Cl.⁶ ....................................................... A44B 1/04
[52] U.S. Cl. ............................................. 24/130; 248/317
[58] Field of Search ..................... 248/317, 320, 248/321, 322, 327, 328; 24/129 R, 130, 115 H, 115 K

[56]           References Cited

U.S. PATENT DOCUMENTS

| 1,069,135 | 8/1913 | Heberling | 24/129 R |
| 2,356,209 | 8/1944 | Brilhart | 24/129 R |
| 3,094,755 | 6/1963 | Casanave | 24/129 R |
| 5,020,192 | 6/1991 | Gerlach | 24/129 R X |
| 5,282,825 | 2/1994 | Muck et al. | 24/115 H |

*Primary Examiner*—Ramon O. Ramirez
*Attorney, Agent, or Firm*—Trexler, Bushnell, Giangiorgi & Blackstone, Ltd.

[57]           ABSTRACT

A method of suspending equipment (40) from an overhead structural member (37) comprises providing a first eye (36) on the overhead member (37), providing a suspension strand (20) with a loop (21) at one end, passing the other, free, end (38) of the strand (20) through the eye (36) and through the loop (21), passing the free end (38) of the strand (20) through one bore (24A) of a locking device (23) of the type having twin bores at least one of which is associated with wedging means preventing withdrawal in the opposite direction to insertion, providing a second eye (39) on the equipment (40) to be suspended, passing the free end (38) of the strand (20) through the eye (39) on the equipment (40), and passing the free end (38) of the strand (20) through the other bore (24B) of the aforesaid device (23).

Variations include passing the free end (38) of the strand (20) round the overhead member (37), through the loop (21) and through the first bore (24A) of the locking device (23), and/or from the locking device (23) passing the free end (38) of the strand (20) round the equipment and through the other bore (24B) of the locking device (23).

24 Claims, 3 Drawing Sheets

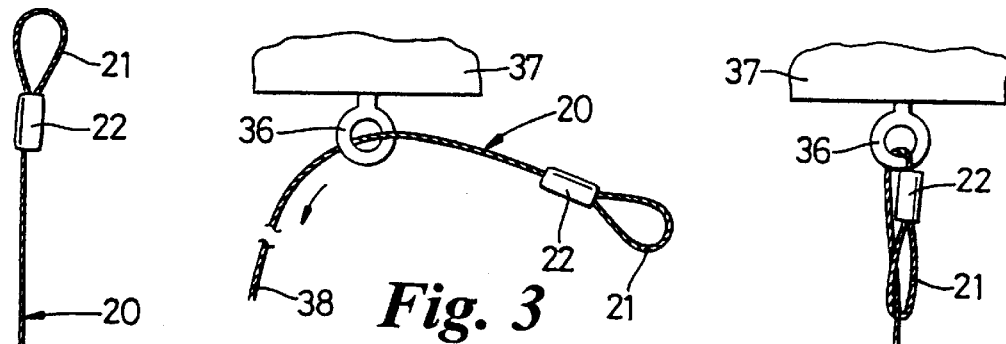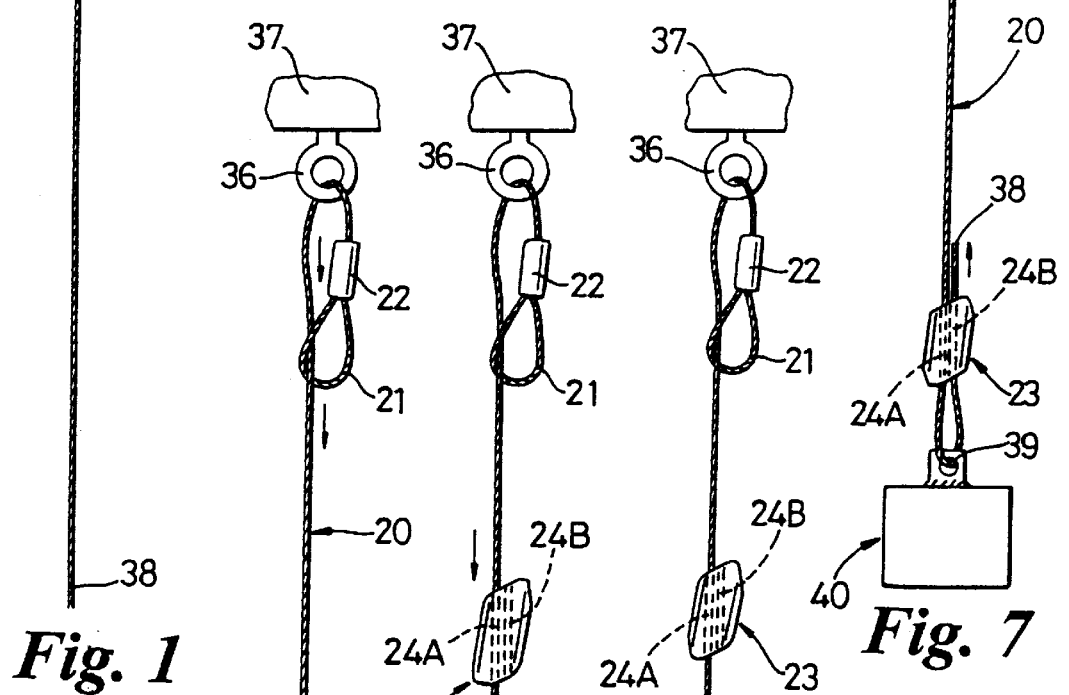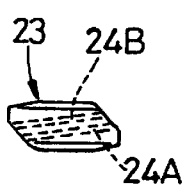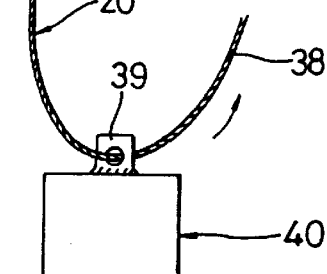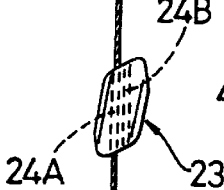

METHOD OF USING, AND KIT FOR A SUSPENDING EQUIPMENT

This invention relates to a method of suspending equipment (such as lighting, heating, trunking or ventilation units) from an overhead structural member (such as a roof, ceiling, purlin, beam or girder).

According to one aspect of the present invention, a method of suspending equipment from an overhead structural member comprises providing a first eye on the overhead member, providing a suspension strand with a loop at one end, passing the other, free, end of the suspension strand through the eye and through the loop, passing the free end of the suspension strand through one bore of a locking device of the type having twin bores at least one of which is associated with wedging means preventing withdrawal in the opposite direction to insertion, providing a second eye on the equipment to be suspended, passing the free end of the suspension strand through the eye on the equipment, and passing the free end of the suspension strand through the other bore of the aforesaid device.

The first eye may be part of a fitting screwed into or bolted or welded to the overhead structural member, or formed by a hole, existing or purposely drilled, through a purlin, beam or girder. Likewise, the second eye may be part of a fitting screwed into or bolted or welded to the equipment to be suspended, unless the second eye can be formed by a hole, existing or purposely drilled, in part of the casing of the equipment.

According to another aspect of the invention, a method of suspending equipment from an overhead structural member comprises providing a suspension strand with a loop at one end, passing the other, free, end of the suspension strand round the overhead member and through the loop, passing the free end of the suspension strand through one bore of a locking device of the type having twin bores at least one of which is associated with wedging means preventing withdrawal in the opposite direction to insertion, passing the free end of the suspension strand round the equipment to be suspended, and passing the free end of the suspension strand through the other bore of the aforesaid device.

According to a further aspect of the invention, a method of suspending equipment from an overhead structural member comprises providing an eye on the overhead member, providing a suspension strand with a loop at one end, passing the other, free, end of the suspension strand through the eye and through the loop, passing the free end of the suspension strand through one bore of a locking device of the type having twin bores at least one of which is associated with wedging means preventing withdrawal in the opposite direction to insertion, passing the free end of the suspension strand round the equipment to be suspended, and passing the free end of the suspension strand through the other bore of the aforesaid device.

Conversely, according to yet another aspect of the invention, a method of suspending equipment from an overhead structural member comprises providing a suspension strand with a loop at one end, passing the other, free, end of the suspension strand round the overhead member and through the loop, passing the free end of the suspension strand through one bore of a locking device of the type having twin bores at least one of which is associated with wedging means preventing withdrawal in the opposite direction to insertion, providing an eye on the equipment to be suspended, passing the free end of the suspension strand through the eye on the equipment, and passing the free end of the suspension strand through the other bore of the aforesaid device.

The suspension strand may be a length of wire or wire rope, or other suitable material, and the loop may be formed by bending back an end length and securing it by a crimped ferrule. After passing the free end of the suspension strand through the first bore of the locking device, a plastics sleeve may be slipped over that free end to stop or reduce transmission of vibration from the equipment, especially ducting, to the suspension strand.

The locking device of the type having twin bores may be of the type described in GB-A-2210517 in which both bores are associated with wedging means preventing withdrawal in opposite directions. Alternatively, the aforesaid device may be of the type described in WO 95/30844 or WO 97/36123 provided with means whereby either wedging means can be released or positively withdrawn, to enable adjustment of the length of the suspension system and thereby adjustment of the height position of the suspended equipment. Adjustment may be effected simply by moving the locking device upwards. Alternatively, a tensioning tool, e.g. as described in WO91/04137, or a blind rivetting tool, may be used on the free end of the suspension strand to effect fine adjustment, especially under load.

According to a still further aspect of the invention an equipment suspension kit comprises at least a suspension strand with a loop at one end, and a locking device of the type having twin bores at least one of which is associated with wedging means preventing withdrawal of the strand in the opposite direction to insertion. However, the kit may also include an eye for securing to an overhead structure, and/or an eye for attachment to equipment to be suspended. If the locking device is of the type described in WO 95/30844 or WO 97/36123, the kit is preferably provided with a tool for releasing or withdrawing either of the wedging means, for adjustment of the length of the suspension system. Plastics sleeving may also be provided in the kit for slipping over part(s) of the suspension strand. While a tensioning tool, as aforesaid, may be provided and/or sold with a kit as aforesaid, it may be economically viable to provide one tensioning tool free with a sizeable order for kits.

It will be evident that large and/or heavy items of equipment to be suspended may require two or more suspensions in accordance with the present invention, in which case each suspension advantageously includes a locking device as aforesaid including means whereby the wedging means can be released or positively withdrawn, to enable the suspended equipment to be levelled, as well as adjusted for height.

Embodiments of the invention will now be described by way of example only, with reference to the accompanying drawings, in which:

FIG. 1 is a side elevation of a suspension strand forming one item of a basic kit in accordance with the invention;

FIG. 2 is a side elevation of a locking device forming the other item of the basic kit;

FIGS. 3 to 7 show diagrammatically one method in accordance with the invention of suspending equipment from an overhead structural member;

The suspension strand 20 shown in FIG. 1 and in FIGS. 3 to 7 is preferably a length of wire rope, and a loop 21 is formed by bending back an end length and securing it by a crimped ferrule 22.

Figure 8:
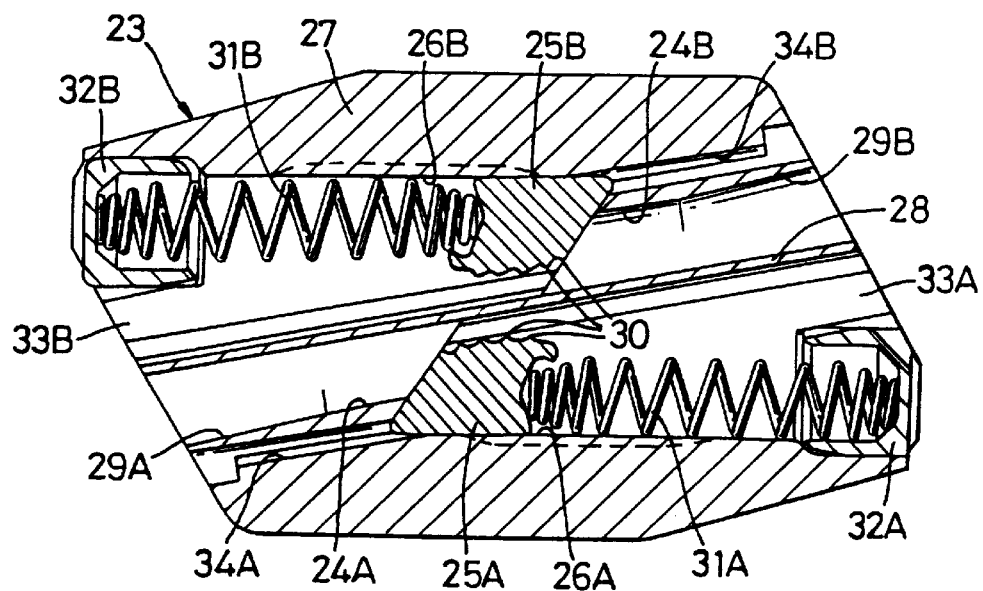
FIG. 8 is a longitudinal section through the locking device shown in FIG. 2 and FIGS. 4 to 7.
Figure 9:
FIG. 9 is a side elevation of a tool for use with the locking device of FIG. 8 for effecting adjustment of the length of the suspension system.

The locking device 23 shown in FIG. 2 and FIGS. 4 to 7 has twin bores 24A, 24B. As can be seen in FIG. 8, wedges 25A, 25B are slidable along respective channels 26A, 26B in the body 27 of the locking device 23, each channel converging at an acute angle to and into communication with a respective one of the twin bores 24A, 24B (which are separated by a thin wall 28) towards an inlet end 29A, 29B of that respective bore, the wedges 25A, 25B being provided with transverse ribs 30 on one face for gripping engagement with the strand 20 under the urge of compression springs 31A, 31B between the wedges and recessed abutments 32A, 32B within the body 27 of the locking device 23 adjacent outlet ends 33A, 33B of the respective bores 24A, 24B. Apertures 34A, 34B in the body 27 of the locking device 23 each have an inner end opening into a respective channel 26A or 26B adjacent the inlet end 29A or 29B of the respective bore 24A or 24B and is available as a guide for a separate tool 35 (FIG. 9) pushed into the channel through the aperture to move the wedge against the urge of its spring to enable the strand 20 to be freed from the grip of the wedge in the respective bore for adjustment in the opposite direction from insertion. For further details see WO95/30844.

One method of suspending equipment from an overhead structural member using the suspension strand 20 and locking device 23 comprises providing a first eye 36 (FIG. 3) on the overhead structural member 37, passing the free end 38 of the suspension strand through the eye and through the loop 21 of the strand (as shown in FIG. 4), passing the free end of the strand through one bore 24A of the locking device (see FIG. 5) from its inlet end 29A, providing a second eye 39 (FIG. 6) on the equipment 40, passing the free end of the strand through the eye 39, and passing the free end of the strand through the other bore 24B of the locking device (see FIG. 7) from its inlet end 29B.

Figure 10:
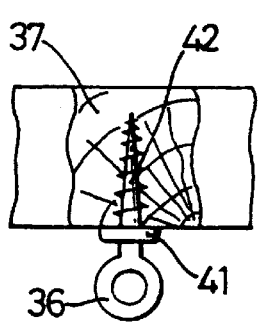
FIGS. 10 to 13 are fragmentary views of parts of overhead structural members showing different ways of providing an eye thereon or therein.
Figure 11:
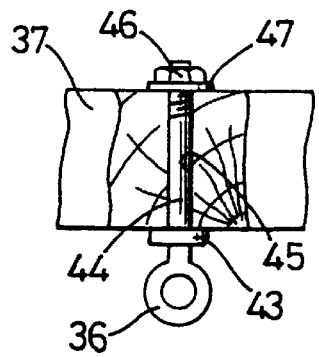
Figure 12:
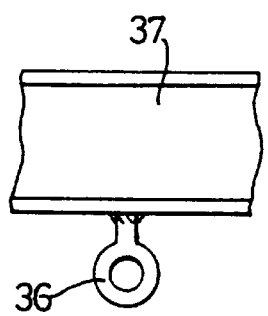
Figure 13:
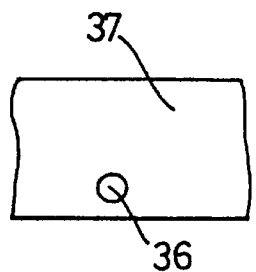

The first eye 36 may be part of a fitting 41 (FIG. 10) having a woodscrew 42 screwing into a wooden beam 37, or part of an eye bolt 43 (FIG. 11) having a shank 44 passing through a hole 45 in a beam 37 and provided with a nut 46 and washer 47. Again, the first eye 36 may be welded to a girder 37, as shown in FIG. 12, or simply formed by a hole, existing or purposely drilled, through a beam 37 (or other overhead structural member) as shown by Figure 13.

Figure 14:
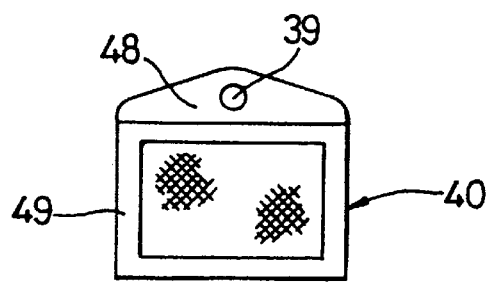
FIG. 14 illustrates a way of providing an item of equipment with a suspension eye.

The second eye 39 may likewise be part of a fitting screwed into or bolted to the equipment 40 to be suspended, or welded to the equipment, as shown in FIGS. 6 and 7, unless the second eye can be formed by a hole, existing or purposely drilled, in part 48 of the casing 49 of the equipment, as shown by FIG. 14.

Figure 15:
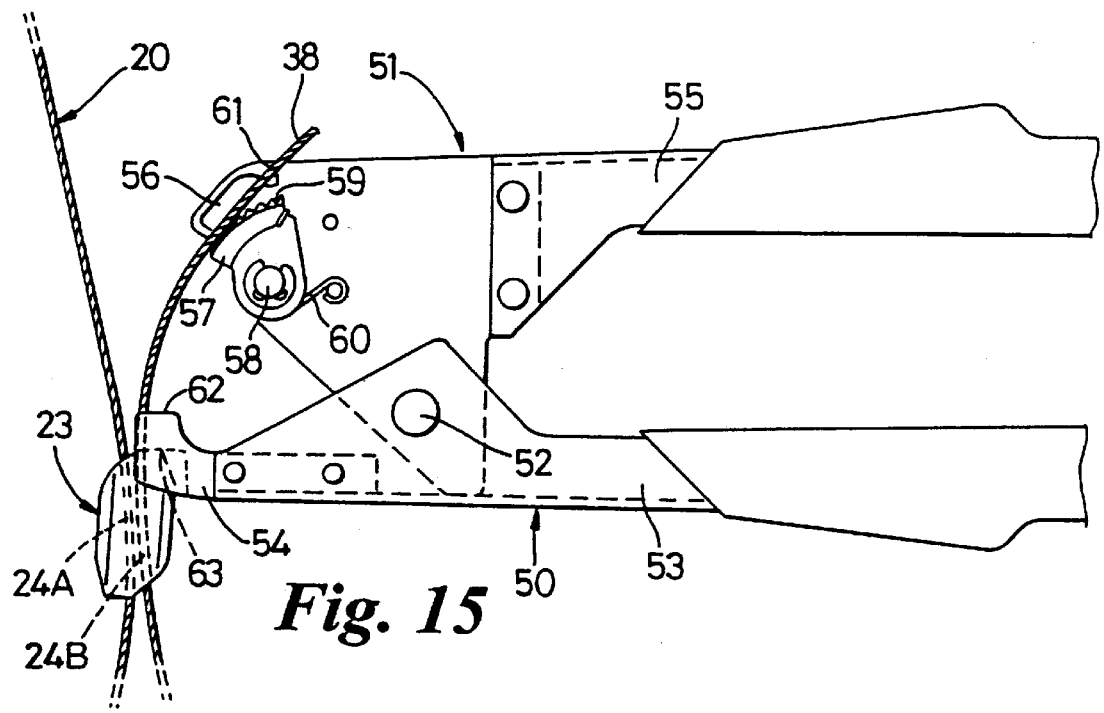
FIG. 15 is a side elevation of the operative end of a tensioning tool used to effect fine adjustment of the length of the suspension system.

The tensioning tool shown in FIG. 15 has a pair of levers 50, 51 connected by a first pivot 52 between a handgrip portion 53 and an abutment portion 54 on the lever 50, the other lever 51 having a handgrip portion 55, a fixed clamping member 56, and a movable clamping member 57 on a pivot 58, the movable clamping member having an eccentric, serrated, strand-engaging face 59 and being urged by a spring 60 to close that face to a strand-engaging face 61 on the fixed clamping member 56, and the arrangement being such that opening of the levers 50, 51 causes a face 62 on the abutment portion 54 to open the clamping members 56, 57 for insertion of the free end 38 of the wire strand 20 therebetween, while subsequent closing of the levers 50, 51 causes the clamping members 56, 57 to grip the free end of the strand and pull it with respect to the locking device 23 held in a recess 63 in the abutment portion 54. For further details see WO91/04137.

Figure 16:
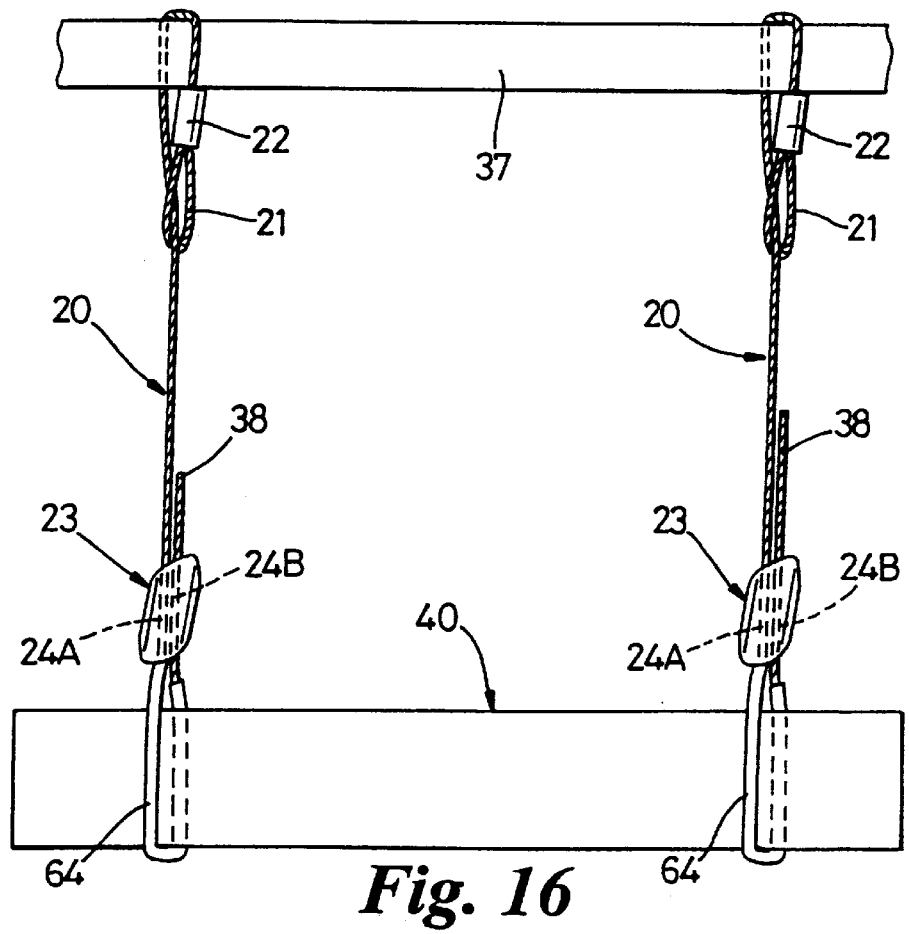
FIG. 16 is a diagrammatic view showing an alternative method of suspending equipment from an overhead structural member, duplicated because of the size of the equipment.

In FIG. 16 a larger item of equipment 40 has been provided with two suspension systems each using a suspension strand 20 provided with a loop 21 at one end, together with a locking device 23 as in FIGS. 1 and 2, but each system is provided by passing the free end 38 of the strand round the overhead member 37 and through the loop before passing the free end through the first bore 24A of the locking device, then passing the free end of the strand round the equipment and, finally, passing the free end of the strand through the other bore 24B of the locking device. A plastics sleeve 64 is shown in each suspension system in FIG. 16 slipped over the free end of the strand before it is passed round the equipment to stop or reduce transmission of vibration from the equipment, especially ducting, to the suspension strand 20.

It will be readily appreciated that alternative suspension systems may be formed by combining the upper part of FIG. 7 with the lower part of one of the suspension systems of FIG. 16, or vice versa, depending on the nature of the overhead structural member and/or the equipment to be suspended.

Likewise, an equipment suspension kit, basically comprising the looped strand 20 and locking device 23, may also include an eye 36 for securing to an overhead structure and/or an eye 39 for attachment to equipment to be suspended and/or plastics sleeving 64.

What we claim is:

1. A method of suspending equipment from an overhead structural member comprising providing a first eye on the overhead member, providing a suspension strand with a loop at one end, passing the other, free, end of the suspension strand through the eye and through the loop, passing the free end of the suspension strand through one bore of a locking device of the type having twin bores at least one of which is associated with wedging means preventing withdrawal in the opposite direction to insertion, providing a second eye on the equipment to be suspended, passing the free end of the suspension strand through the eye on the equipment, and passing the free end of the suspension strand through the other bore of the aforesaid device.

2. A method as in claim 1 wherein the first eye is part of a fitting screwed into or bolted or welded to the overhead structural member.

3. A method as in claim 1 wherein the first eye is formed by a hole through a purlin, beam or girder.

4. A method as in claim 1, wherein the second eye is part of a fitting screwed into or bolted or welded to the equipment to be suspended.

5. A method as in claim 1, wherein the second eye is formed by a hole in part of the casing of the equipment.

6. A method as in claim 1, wherein the suspension strand is a length of wire or wire rope, and the loop is formed by bending back an end length and securing it by a crimped ferrule.

7. A method as in claim 1, wherein the locking device is of the type in which both bores are associated with wedging means preventing withdrawal in opposite directions.

8. A method as in claim 7, wherein the locking device is provided with means whereby either wedging means can be released or positively withdrawn, to enable adjustment of the length of the suspension system and thereby adjustment of the height position of the suspended equipment.

9. A method as in claim 1, wherein adjustment is effected by moving the locking device upwards.

10. A method as in claim 1, wherein a tensioning tool is used on the free end of the suspension strand to effect fine adjustment.

11. A method as in claim 10, wherein the tensioning tool is a blind rivetting tool.

12. A method of suspending equipment from an overhead structural member comprising providing a suspension strand with a loop at one end, passing the other, free, end of the suspension strand round the overhead member and through the loop, passing the free end of the suspension strand through one bore of a locking device of the type having twin bores at least one of which is associated with wedging means preventing withdrawal in the opposite direction to insertion, passing the free end of the suspension strand round the equipment to be suspended, and passing the free end of the suspension strand through the other bore of the aforesaid device.

13. A method as in claim 12, wherein after passing the free end of the suspension strand through the first bore of the locking device, a plastics sleeve is slipped over that free end to stop or reduce transmission of vibration from the equipment, to the suspension strand.

14. A method of suspending equipment from an overhead structural member comprising providing an eye on the overhead member, providing a suspension strand with a loop at one end, passing the other, free, end of the suspension strand through the eye and through the loop, passing the free end of the suspension strand through one bore of a locking device of the type having twin bores at least one of which is associated with wedging means preventing withdrawal in the opposite direction to insertion, passing the free end of the suspension strand round the equipment to be suspended, and passing the free end of the suspension strand through the other bore of the aforesaid device.

15. A method as in claim 14, wherein after passing the free end of the suspension strand through the first bore of the locking device, a plastics sleeve is slipped over that free end to stop or reduce transmission of vibration from the equipment, to the suspension strand.

16. A method of suspending equipment from an overhead structural member comprising providing a suspension strand with a loop at one end, passing the other, free, end of the suspension strand round the overhead member and through the loop, passing the free end of the suspension strand through one bore of a locking device of the type having twin bores at least one of which is associated with wedging means preventing withdrawal in the opposite direction to insertion, providing an eye on the equipment to be suspended, passing the free end of the suspension strand through the eye on the equipment, and passing the free end of the suspension strand through the other bore of the aforesaid device.

17. An equipment suspension kit comprising at least a suspension strand with a loop at one end, and a locking device of the type having twin bores at least one of which includes wedging means preventing withdrawal of the strand in the opposite direction to insertion.

18. A kit as in claim 17 including an eye for securing to an overhead structure.

19. A kit as in claim 18 including an eye for attachment to equipment to be suspended.

20. A kit as in claim 17 including generally flexible plastics sleeving for slipping over part of the suspension strand.

21. A kit as in claim 17 wherein the locking device is provided with means whereby the wedging means can be released or positively withdrawn.

22. A kit as in claim 21 including a tool for effecting release or positive withdrawal of the wedging means.

23. A kit as in claim 17 including a tensioning tool.

24. A kit as in claim 23 wherein the tensioning tool is a blind rivetting tool.

* * * * *